United States Patent Office 2,834,790
Patented May 13, 1958

2,834,790
HEXACHLOROCYCLOPENTADIENE ADDUCT

Wilbur L. Bressler and John C. Smith, Lake Jackson, Tex., assignors to The Dow Chemical Company, Midland, Mich., a corporation of Delaware No Drawing. Application June 4, 1956
Serial No. 588,982

1 Claim. (Cl. 260—348)

This invention relates to a new and useful hexachlorocyclopentadiene adduct, and more particularly to the 1,4,5,6,7,7 - hexachloro - 2 - (2,3-epoxypropoxymethyl)-bicyclo(2.2.1) - 5 - heptene which may be represented by the following forumla:

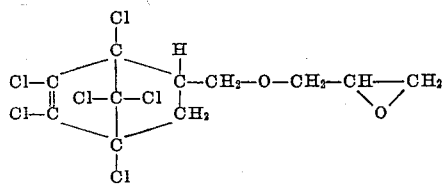

This new compound is a high boiling liquid material which is useful as a reactive diluent for epoxy resins to decrease the viscosity of the unset solutions of the resin and to impart fire resistant characteristics to the resins. The use of this compound as a reactive diluent aids in fabrication of articles from epoxy resins, such as p,p'-isopropylidenediphenol-epichlorohydrin condensation products, and considerably increases the possible uses of these resins due to their non-combustible properties.

The new compound may be prepared by the Diels-Adler diene synthesis. The reaction may be simply carried out by reacting hexachlorocyclopentadiene as the diene with allyl glycidyl ether as the dienophile to obtain the adduct product. Stoichiometric amounts of the reactants may be used and it is advantageous to use a reaction diluent, such as xylene, the boiling of which serves to control the reaction temperature. The reactants with the diluent may be added to a reactor and the reactants reacted by refluxing the reaction mixture from 1 to 24 hours, preferably from 2 to 4 hours. To recover the adduct product, the reaction mass is distilled at a reduced pressure, such as about 100 mm., to remove the diluent and may then be distilled at still lower pressure, such as about 0.6 mm., to obtain the adduct.

In the following examples, Example I describes in detail the preparation of the new compound and Example II illustrates the improvement obtained in the epoxy resins when the compound is used as reactive diluent.

Example I

To a 250 ml. round-bottom flask equipped with a reflux condenser, were added 81.9 gms. (0.3 mole) of hexachlorocyclopentadiene, 34.2 gms. (0.3 mole) of allyl glycidyl ether and 75 ml. of xylene. A yellow solution was obtained which was refluxed for 24 hours. The color of the solution darkened as the refluxing was continued and at the end of 24 hours the color darkened to brown.

The reacted solution was transferred to a distillation apparatus and the xylene removed by distilling the reacted mixture at a reduced pressure of around 100 mm. After the xylene was removed, the pressure was reduced to 0.6 mm. and the distillation continued. The product distilled over at a temperature of 149° to 153° C., and upon condensation 91.5 gms. of the pale yellow mobile liquid was collected. A black tarry residue remained in the distillation flask after the distillation.

An analytical sample of the product was found to have a boiling point of 180° to 182° C. at 1.1 mm. of pressure.

Analysis:                                    Percent
  Carbon _____ 34.99
  Hydrogen _____ 2.59
  Chlorine _____ 54.96
  Epoxy group —CH—CH$_2$ _____ 10.44
                  \\ /
                   O Calculated for $C_{11}H_{10}Cl_6O_2$:
  Carbon _____ 34.15
  Hydrogen _____ 2.61
  Chlorine _____ 54.95
  Epoxy group —CH—CH$_2$ _____ 11.11
                  \\ /
                   O The compound is thus the expected adduct of hexachlorocyclopentadiene and allyl glycidyl ether in molar ratio of 1:1.

Example II

A mixture was prepared containing 50 parts by weight of 1,4,5,6,7,7 - hexachloro - 2 - (2,3-epoxypropoxymethyl) - bicyclo(2.2.1.) - 5 - heptene and 50 parts by weight of a p,p'-isopropylidenediphenol-epichlorohydrin and condensation product which was obtained by reacting 1 mole of p,p'-isopropylidenediphenol with 10 moles of epichlorohydrin and 1.02 moles of caustic. The p,p'-isopropylidenediphenol used was similar to the product sold by The Dow Chemical Company under the trade name "Bisphenol A." The viscosity of this mixture was 25 stokes where the viscosity was determined by a bubble viscosimeter. This mixture was set or cured by adding 10 percent by weight of diethylene triamine and heating the mixture at 130° C. for 30 minutes.

The properties of the resin containing the new compound prepared as described above are shown below compared to the properties of the resins prepared in the same manner but without the new compound.

|  | Epoxy Resins | |
| --- | --- | --- |
|  | Without novel Adduct | With novel Adduct |
| Viscosity of mixture prior to setting. | 125-150 stokes | 25 stokes. |
| Rockwell Hardness | M 100 | M 88. |
| Izod Impact Strength | 0.36 ft.-lb. per inch of notch. | 0.58 ft.-lb. per inch of notch. |
| Flammability | Supports combustion. | Self-extinguishing. |

What is claimed is:
The compound, 1,4,5,6,7,7 - hexachloro - 2 - (2,3-epoxypropoxymethyl) - bicyclo (2.2.1.) - 5 - heptene.

References Cited in the file of this patent
UNITED STATES PATENTS
2,616,899    Ladd _____ Nov. 4, 1952
OTHER REFERENCES
Fields: J. A. C. S., 76:2709–10 (1954).